(12) United States Patent
Schäfer et al.

(10) Patent No.: US 11,015,058 B2
(45) Date of Patent: May 25, 2021

(54) COMPOSITION COMPRISING COLORANTS

(71) Applicant: WACKER CHEMIE AG, Munchin (DE)

(72) Inventors: Oliver Schäfer, Burghausen (DE); Peter Randel, Altusried (DE)

(73) Assignee: Wacker Chemie AG, Munich (DE)

( * ) Notice: Subject to any disclaimer, the term of this patent is extended or adjusted under 35 U.S.C. 154(b) by 47 days.

(21) Appl. No.: 16/462,031

(22) PCT Filed: Nov. 18, 2016

(86) PCT No.: PCT/EP2016/078159
§ 371 (c)(1),
(2) Date: May 17, 2019

(87) PCT Pub. No.: WO2018/091104
PCT Pub. Date: May 24, 2018

(65) Prior Publication Data
US 2019/0330471 A1    Oct. 31, 2019

(51) Int. Cl.
| | | |
|---|---|---|
| *C08L 83/04* | (2006.01) |
| *C08K 3/04* | (2006.01) |
| *C08K 3/22* | (2006.01) |
| *C08K 3/013* | (2018.01) |
| *C08G 77/04* | (2006.01) |
| *C08G 77/445* | (2006.01) |
| *C08G 77/46* | (2006.01) |
| *C08K 5/00* | (2006.01) |
| *C08L 83/12* | (2006.01) |

(52) U.S. Cl.
CPC .............. *C08L 83/04* (2013.01); *C08G 77/04* (2013.01); *C08G 77/445* (2013.01); *C08G 77/46* (2013.01); *C08K 3/013* (2018.01); *C08K 3/04* (2013.01); *C08K 3/22* (2013.01); *C08K 5/0041* (2013.01); *C08L 83/12* (2013.01); *C08K 2003/2241* (2013.01); *C08L 2310/00* (2013.01)

(58) Field of Classification Search
CPC .................................. C08L 83/10; C08J 3/22
See application file for complete search history.

(56) References Cited

U.S. PATENT DOCUMENTS

| | | | |
|---|---|---|---|
| 5,639,582 A * | 6/1997 | Imai ............... | G03G 9/08773 430/108.3 |
| 6,589,538 B1 | 7/2003 | Lemann et al. | |
| 2003/0191244 A1 | 10/2003 | Yu | |
| 2004/0091439 A1 | 5/2004 | Kamei et al. | |
| 2006/0009555 A1 | 1/2006 | Haubennestel et al. | |
| 2008/0255317 A1 | 10/2008 | Schaefer et al. | |
| 2013/0178581 A1 | 7/2013 | Heldmann | |
| 2013/0313493 A1 | 11/2013 | Wen et al. | |
| 2017/0029648 A1 | 2/2017 | Asada et al. | |

FOREIGN PATENT DOCUMENTS

| | | |
|---|---|---|
| CN | 1443525 A | 9/2003 |
| EP | 2607426 A1 | 6/2013 |
| JP | H07187954 A | 7/1995 |
| JP | H0987157 A | 3/1997 |
| JP | 2000026736 A | 1/2000 |
| JP | 2004169015 A | 6/2004 |
| JP | 2004331616 A | 11/2004 |
| KR | 20080053412 A | 6/2008 |
| KR | 101275835 B1 | 6/2013 |
| KR | 101515824 B1 | 4/2015 |
| WO | 2010117268 A1 | 10/2010 |
| WO | 2015170536 A1 | 11/2015 |

* cited by examiner

*Primary Examiner* — Marc S Zimmer
(74) *Attorney, Agent, or Firm* — Brooks Kushman P.C.

(57) ABSTRACT

The invention relates to compositions containing dye, containing (A) at least one dye, (B) at least one organopolysiloxane containing units of the general formula $R_a(R^1O)_b SiO_{[4-(a+b)]/2}$ (I), wherein the radicals and indexes have the meaning indicated in claim 1, provided that the total is a+b≤3 and in more than 80% of all units, the formula (I) is equal to 2, and (C) at least one siloxane-organo-copolymer. The invention further relates to a method for the production thereof and to the use thereof in the dyeing of polymer materials.

14 Claims, No Drawings

COMPOSITION COMPRISING COLORANTS

CROSS-REFERENCE TO RELATED APPLICATIONS

This application is a U.S. National Phase Application of PCT/EP2016/078159, filed Nov. 18, 2016 the contents of which are incorporated herein by reference in their entirety for all purposes.

FIELD OF THE INVENTION

The present invention relates to colorant-comprising compositions, to a method for producing them, and to their use in the coloring of polymer materials.

BACKGROUND OF THE INVENTION

It is known practice to color polyester and polyamide fibers either by bath dyeing (HT process, Thermosol process, reactive dyeing) or by spin dyeing (mass dyeing), in other words to incorporate an active ingredient, in the form of a color pigment, for example, into the fibers. The principle of bath dyeing is that the dye is caused to penetrate the fiber to a greater or lesser extent. Under suitable conditions (duration of the treatment, temperature), the fiber becomes imbued with the dye or another active ingredient, such as a fungicide, for example. There is no restriction here in the selection of the hues. With technical fibers, however, in contrast to textile fibers, the colorfastnesses achieved to date are generally not sufficient. Here, therefore, mass dyeing is preferred, wherein the masterbatches based on the polymer on which the fiber is based are employed as dye concentrates. Owing to the high heat load which accompanies production and use of the masterbatches, however, only thermally stable dyes can be employed.

Color masterbatches are presently produced typically from plastics pellets and colorants. Coloring is accomplished by the mixing and melting process of colorant and plastics pellets with admixing of small amounts of additives in the twin-screw extruder. Both single-stage and two-stage masterbatch production are in practice. Whereas, in the case of the single-stage manufacture, all of the raw material components are introduced and extruded immediately, the two-stage manufacture goes by way of what are called "monoconcentrates", which in the second step are again mixed, the mixtures being extruded, possibly with addition of additives. The homogeneity of the hue in the plastic depends on the flow behavior achieved in the melt and/or on the effectiveness of distribution of the masterbatch in the matrix. For each class of plastic, therefore, there are specific types of masterbatch.

A fundamental problem affecting masterbatch production is that pigments whose primary particles are in the size range from a few nanometers up to several micrometers must be incorporated into the macromolecular materials in the melt mixing process. The uptake of the pigment aggregates and agglomerates and the homogeneous dispersal of the pigments in the sometimes very high-viscosity plastics melt, however, may certainly be problematic. A further factor is that it is not possible to predict the mixing behavior of colorants in the respective plastics, especially where concentrations of pigments and/or dyes are relatively high, and so the production of masterbatches in particular often causes difficulties, since the colorants—that is, for example, pigments or dyes—to be incorporated into a respective plastic often undergo caking or agglomeration, resulting in severe inhomogeneities. This leads to adverse properties of the masterbatch, with regard for example to rheological or mechanical properties.

With certain pigments, and especially the much-used carbon black, furthermore, it may be the case that when distributed effectively in the masterbatch, the carbon black strongly influences the masterbatch rheologically, in other words greatly increasing the melt viscosity of this masterbatch, so that subsequent distribution in a low-viscosity base material is greatly hindered, possibly leading in turn to the inhomogeneity.

Alternatives to color masterbatches based on plastics pellets are pigment or dye preparations in liquid carrier substances in which the pigments used can easily be incorporated by using suitable apparatuses such as, for example, dissolvers. These apparatuses are described in WO-A 10117268 and EP-A 2607426, for example. Disadvantages of the mixing described here include the possibility of the carrier substances, owing to their miscibility, adversely affecting the mechanical properties of the colored plastic, and also the fact that the only products that can be used here are those of relatively low molecular mass, since only such products have a sufficiently low viscosity to be able to ensure sufficiently good incorporation by mixing with the pigments and/or dyes while at the same time also being technically processable subsequently in the form of the processed pigment formulation. At the processing temperatures, particularly of industrial plastics such as PET or polyamide, for example, of more than 250° C., however, these oligomeric carrier substances already have notably high vapor pressures, and so in the course of extrusion processes it is possible among other things for these carrier substances to evaporate, which is undesirable.

BRIEF SUMMARY OF THE INVENTION

A subject of the invention are colorant-comprising compositions comprising
(A) at least one colorant,
(B) at least one organopolysiloxane containing units of the general formula $$R_a(R^1O)_b SiO_{[4-(a+b)]/2} \quad (I),$$

where
R may be identical or different and is a monovalent, SiC-bonded, optionally substituted hydrocarbon radical which may be interrupted by heteroatoms,
$R^1$ may be identical or different and represents hydrogen atom or a monovalent, optionally substituted hydrocarbon radical which may be interrupted by heteroatoms,
a is 0, 1, 2 or 3, and
b is 0, 1, 2 or 3,
with the proviso that the sum a+b≤3 and in more than 80% of all units of the formula (I) a is 2, and also
(C) at least one siloxane-organo copolymer.

DETAILED DESCRIPTION OF PREFERRED EMBODIMENTS

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and the 2-propenyl radical; aryl radicals such as the phenyl, naphthyl, anthryl and phenanthryl radical; alkaryl radicals such as o-, m-, p-tolyl radicals; xylyl and ethylphenyl radicals; or aralkyl radicals such as the benzyl radical or the α- and the β-phenylethyl radical.

Examples of substituted hydrocarbon radicals R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and also the chlorophenyl radical; mercaptoalkyl radicals, such as the 2-mercaptoethyl and 3-mercaptopropyl radical; cyanoalkyl radicals, such as the 2-cyanoethyl and 3-cyanopropyl radical; aminoalkyl radicals, such as the 3-aminopropyl radical; acyloxyalkyl radicals, such as the 3-acryloyloxypropyl and 3-methacryloyloxypropyl radical; hydroxyalkyl radicals, such as the hydroxypropyl radical; or epoxide radicals such as the glycidyloxypropyl radical.

Radical R preferably denotes a monovalent hydrocarbon radical having 1 to 20 carbon atoms and substituted optionally by halogen atoms, mercapto groups, cyano groups, amino groups, acyloxy groups, hydroxyl groups or glycidyloxy groups, more preferably a hydrocarbon radical having 1 to 6 carbon atoms and optionally substituted by halogen atoms, mercapto groups, cyano groups, amino groups, acyloxy groups, hydroxyl groups or glycidyloxy groups, more particularly the methyl, ethyl, propyl, vinyl, phenyl, 3-methacryloyloxypropyl, 1-methacryloyl-oxymethyl, 1-acryloyloxymethyl or 3-mercaptopropyl radical, and very preferably the methyl radical.

Examples of radical $R^1$ are the radicals indicated for the radical R.

Radical $R^1$ preferably comprises hydrocarbon radicals having 1 to 18 carbon atoms, more preferably hydrocarbon radicals having 1 to 8 carbon atoms, more particularly methyl or ethyl radicals.

Preferably a is 2 or 3.

Preferably b is 0 or 1.

The component (B) used in accordance with the invention preferably comprises organopolysiloxanes consisting of units of the formula (I).

With particular preference the component (B) used in accordance with the invention comprises organopolysiloxanes which are liquid at 20° C. and 1000 hPa.

The component (B) used in accordance with the invention preferably comprises substantially linear organopolysiloxanes, more preferably dialkylpolysiloxanes having a fraction of branches, i.e., of units of the formula (I) with a+b less than 2, of not more than 0.1 mol %, and more particularly comprises trialkylsilyl-terminated dialkylpolysiloxanes having a fraction of branches, i.e., of units of the formula (I) with a+b less than 2, of not more than 0.1 mol %.

Examples of the component (B) used in accordance with the invention are $Me_3SiO_{1/2}(Me_2SiO_{2/2})_{30-600}SiMe_3$, $HOMe_2SiO_{1/2}(Me_2SiO_{2/2})_{30-600}SiMe_2OH$, $Me_3SiO_{1/2}(Me_2SiO_{2/2})_{30-600}(C_6H_5MeSiO_{2/2})_{1-100}SiMe_3$, $Me_3SiO_{1/2}(Me_2SiO_{2/2})_{30-600}((C_6H_5)_2SiO_{2/2})_{1-100}SiMe_3$; $HOMe_2SiO_{1/2}(Me_2SiO_{2/2})_{30-600}(C_6H_5MeSiO_{2/2})_{1-100}SiMe_2OH$ and $HOMe_2SiO_{1/2}(Me_2SiO_{2/2})_{30-600}((C_6H_5)_2SiO_{2/2})_{1-100}SiMe_2OH$.

The organopolysiloxanes (B) used in accordance with invention possess a viscosity at 20° C. preferably of 5 to 200 000 mPa·s, more preferably 50 to 100 000 mPa·s, very preferably 100 to 10 000 mPa·s, measured according to DIN 53019.

Components (B) are commercial products and/or can be prepared by methods commonplace in silicon chemistry.

Siloxanes (B) are used preferably in amounts of 5 to 90 wt %, more preferably of 30 to 80 wt %, based in each case on the total weight of the components (A), (B) and (C).

The colorants (A) used in accordance with the invention may be all colorants known to date.

By colorants are meant all substances having an optical effect. Examples of colorants (A) are the examples stated in DIN ISO 18451.

The colorants (A) comprise preferably inorganic or organic colorants or precursors thereof, more preferably those selected from inorganic dyes, organic dyes, inorganic pigments and organic pigments and also precursors thereof.

Examples of pigments (A) are inorganic pigments such as those from the group of the oxides, e.g. iron oxide (brown, red, black), chromium oxide (green), titanium dioxide, or carbon, e.g. carbon black, or chromates, e.g. lead chromate yellow, molybdate orange, or complexes of inorganic chromatic pigments, e.g. chromium titanium yellow, chromium iron brown, cobalt blue, nickel titanium yellow, zinc iron brown, bismuth vanadate yellow, or sulfides, e.g. cadmium sulfide (yellow, orange, red), cerium sulfide (yellow, orange, red), ultramarine (violet, blue) and zinc sulfide (white), organic pigments, such as azo pigments, e.g. laked azo pigments (yellow, red), disazo pigments (yellow, orange, red), disazo condensation pigments (yellow, red), benzimidazole pigments (yellow, orange), metal complex pigments (yellow), isoindoline pigments (yellow), isoindolinone pigments (yellow), or else polycyclic pigments, e.g. quinacridone (violet, blue), quinophthalone (yellow), diketopyrrolopyrrole (orange, red, violet), dioxazine pigments (violet), indanthrone (blue), perylene (red, violet) and phthalocyanine (blue, green).

Examples of dyes (A) are anthraquinone, quinophthalone, pyrazolone, perinone and monoazo dyes, and also fluorescent dyes, e.g. perylene, naphthalimide, cumin derivatives, thioindigo or thioxanthene-benzanthrone.

The colorants (A) comprise preferably inorganic or organic pigments, more preferably carbon-based pigments and metal oxide pigments, more particularly carbon black or titanium dioxide.

The BET surface area of the colorants (A) used, determined according to ISO 4652, is preferably between 10 and 2000 $m^2/g$, very preferably between 40 and 1100 $m^2/g$.

The sieve residue of the colorants (A) used—measured in a method based on DIN EN ISO 787-7:2009—is preferably less than 10% when using a 45 μm sieve, very preferably less than 1%.

The primary particle size of the colorants (A) used in accordance with the invention is preferably less than 1 μm, more preferably less than 0.1 μm.

Colorants (A) are used preferably in amounts of 0.5 to 85 wt %, more preferably in amounts of 1 to 80 wt %, more particularly in amounts of 10 to 50 wt %, based in each case on the total weight of the components (A), (B) and (C).

The organic segments in the copolymers (C) comprise preferably (co)polymers of (methyl) methacrylate, of polyalkylene oxides, or comprise polyester segments, and more preferably the organic segments in the copolymers (C) comprise aliphatic polyester segments.

In the copolymers (C) used in accordance with the invention, the distribution of the siloxane segments and the organo segments may be as desired, e.g. random. Component (C)

preferably comprises block polymers or comb polymers, more preferably block copolymers.

Preferably the siloxane segments in component (C) have a molecular weight Mn of preferably 1000 to 10 000 g/mol.

The number-average molecular weight Mn here is determined for the purposes of the present invention by means of size exclusion chromatography (SEC) against polystyrene standard, in THF, at 60° C., flow rate 1.2 ml/min and detection by RI (refractive index detector) on a Styragel HR3-HR4-HR5-HR5 column set from Waters Corp. USA with an injection volume of 100 µl.

The fraction of the siloxane segment in the siloxane-organo copolymer (C) used in accordance with the invention is preferably at least 25 wt %, and the fraction of the organo segment in the component (C) is preferably not more than 75 wt %, very preferably not more than 60 wt %.

With particular preference component (C) comprises a polysiloxane-polycaprolactone block copolymer containing siloxane segments having in each case a molecular weight Mn of 1000 to 10 000 g/mol, preferably 2000 to 4000 g/mol.

Component (C) preferably possesses a viscosity of below 20 Pa's in the temperature range from 20 to 100° C.

Component (C) preferably comprises siloxane-organo copolymers containing units of the general formula

$$R^2_c(R^3O)_d SiO_{[4-(c+d)]/2} \qquad (II),$$

in which
$R^2$ may be identical or different and is a monovalent, SiC-bonded, optionally substituted hydrocarbon radical which may be interrupted by heteroatoms,
$R^3$ may be identical or different and represents hydrogen atom or a monovalent, optionally substituted hydrocarbon radical which may be interrupted by heteroatoms,
c is 0, 1, 2 or 3, and
d is 0, 1, 2 or 3,
with the proviso that the sum c+d≤3 and in more than 80% of all units of the formula (II) c is 2,
and also units of the general formula

$$R^2_f L_e SiO_{[4-(f+e)]/2} \qquad (III),$$

in which
e is 1, 2 or 3,
f is 0, 1 or 2,
with the proviso that the sum e+f≤3,
L is a radical selected from radicals of the formula (IV) $R^4-[O-(CH_2)_5-CO-]_v-[O-(CR^5_2)_n-CO-]_n-X-$ and radicals of the formula (V) $R^4-[O-(CH_2)_2]_v-[O-(CR^5_2)_m]_u-X-$,
X may in each case be the same or different and is —O—, —NR$^6$—R$^7$— or —O—R$^7$—,
R$^6$ may be the same or different and is hydrogen atom or monovalent, substituted or unsubstituted hydrocarbon radicals,
R$^7$ may be the same or different and is divalent, substituted or unsubstituted hydrocarbon radicals having 1 to 40 carbon atoms, which may be interrupted by oxygen atoms,
R$^4$ may be the same or different and is hydrogen atom or monovalent, substituted or unsubstituted hydrocarbon radicals,
R$^5$ may be the same or different and is hydrogen atom or monovalent, substituted or unsubstituted hydrocarbon radicals,
n is an integer from 3 to 10, preferably 5,
m is an integer from 2 to 6, preferably 2,
u is 0 or an integer of at least 1, preferably at least 2, and v is 0 or an integer of at least 1, preferably at least 2, with the proviso that both in formula (IV) and in formula (V) the sum u+v is an integer of at least 2.

Examples and preferred examples of radical R$^2$ are the examples and preferred ranges stated above for radical R.

Examples and preferred examples of radical R$^3$ are the examples and preferred ranges stated above for radical R$^1$.

Preferably c is a number 2 or 3, very preferably 2.
Preferably d is a number 0 or 1, very preferably 0.
Preferably e is a number 1 or 2, very preferably 1.
Preferably f is a number 1 or 2, very preferably 2.

Examples of radical R$^4$, R$^5$ and R$^6$ are independently of one another the examples stated above for radical R, or hydrogen atom.

Radical R$^4$ preferably comprises hydrogen atom or monovalent hydrocarbon radicals having 1 to 12 carbon atoms, more preferably hydrogen atom or monovalent hydrocarbon radicals having 1 to 4 carbon atoms, more particularly hydrogen atom, methyl radicals or ethyl radicals.

Radical R$^5$ preferably comprises hydrogen atom or monovalent hydrocarbon radicals having 1 to 12 carbon atoms, more preferably hydrogen atom or monovalent hydrocarbon radicals having 1 to 4 carbon atoms, more particularly hydrogen atom, methyl radicals or ethyl radicals.

Radical R$^6$ preferably comprises hydrogen atom or monovalent hydrocarbon radicals having 1 to 12 carbon atoms, more preferably hydrogen atom or monovalent hydrocarbon radicals having 1 to 4 carbon atoms, more particularly hydrogen atom, methyl radicals or ethyl radicals.

Examples of radical R$^7$ are methylene, propylene, hexylene and also —C$_2$H$_4$—O—C$_3$H$_6$— radicals.

Radical R$^7$ preferably comprises divalent hydrocarbon radicals having 1 to 12 carbon atoms, more preferably divalent hydrocarbon radicals having 1 to 6 carbon atoms, more particularly divalent hydrocarbon radicals having 3 carbon atoms.

Examples of radical L of the formula (IV) are aliphatic polyester polymers, preference being given to polycaprolactone-based copolymers and particular preference to homopolymers of polycaprolactone.

Examples of radical L of the formula (V) are polyether copolymers and polyether homopolymers, preference being given to polyether copolymers and particular preference to polyethylene oxide-co-propylene oxide polymers.

Radical L preferably comprises polycaprolactones or polyethylene oxide-co-propylene oxide polymers, more preferably polycaprolactones or polyethylene oxide-co-propylene oxide polymers having a molecular weight of 500 to 2500 g/mol, more particularly polycaprolactones having a molecular weight of 1000 to 2100 g/mol.

The siloxane-organo copolymers (C) used in accordance with the invention are already known and can be prepared by processes that are known per se, such as, for example, by ring-opening polymerization of cyclic esters by means of reactive siloxanes. Corresponding products are available commercially, for instance under the product name "WAX OH 350 D" from Wacker Chemie AG and also under the product name "NIAX L626 or NIAX L 627" from Momentive Performance Materials, Waterford, USA.

Preference is given to using copolymers (C) in amounts of 0.1 to 50 wt %, more preferably of 5 to 40 wt %, based in each case on the total weight of the components (A), (B) and (C).

In the composition of the invention, the amount of component (C) used is preferably smaller than the amount of component (B) used.

Additionally to the components (A), (B) and (C), the compositions of the invention may comprise further substances, different from the components (A), (B) and (C), such as, for example, nanofillers (D), stabilizers (E), antistats (F), flame retardants (G), adhesion promoters (H), nucleating agents (I), propellants (J), and antibacterial agents (K).

The total amount of any further substances (D) to (K) used is preferably 0 to 20 wt %, based on the weight of the composition of the invention.

The total amount of any further substances used is preferably 0 to 20 wt %, based on the weight of the composition of the invention.

To produce the compositions of the invention, preferably no further constituents beyond the components (A), (B) and (C), and also, optionally, (D) to (K), are used, and more preferably no further constituents beyond the components (A), (B) and (C) and also, optionally (E) are used in producing the compositions of the invention.

The individual constituents of the composition of the invention may in each case comprise one kind of such a constituent or else a mixture of at least two different kinds of such constituents.

The composition of the invention is preferably liquid in the temperature range between 20 and 100° C. and at 1000 hPa.

The compositions of the invention may be produced by any desired means that are known per se.

A further subject of the present invention is a method for producing the organopolysiloxane compositions of the invention by mixing the individual constituents.

The colorant (A) in this case is mixed preferably into the components (B) or (C) or into the mixture of (B) and (C), and preferably colorants (A) are distributed homogeneously in components (B) and/or (C).

Mixing may be carried out using any existing mixing assemblies, such as, for example, stirrers, dissolvers, kneading apparatus, roll mills, high-pressure homogenizers, ultrasonic homogenizers, and dispersing devices of the "Ultra-Turrax" type.

During the mixing according to the invention, solvents may optionally be added; here, preferably, the use of solvents is omitted.

The mixing takes place here preferably at temperatures of preferably 0 to 180° C., more preferably at temperatures of 10 to 100° C.

In one particularly preferred embodiment of the method of the invention, a mixture of the components (B) and (C) is introduced and colorant (A) is added to this mixture. The colorants may be added at temperatures around 20'C or else at elevated temperatures, with the mixture according to the invention heating up by mixing energy introduced via the mixing operation. Mixing at elevated temperature from about 40 to 100° is particularly preferred here.

The method of the invention is carried out preferably under the pressure of the surrounding atmosphere, in other words about 900 to 1100 hPa.

Preferably, however, the method of the invention is carried out in an inert atmosphere, such as nitrogen or argon, for example, with very extensive exclusion of moisture.

The compositions of the invention, then, can be used for all purposes for which colorant-comprising compositions have also been employed to date, preferably as a coloring addition in the production of plastics, plastics profiles or plastics fibers. Through controlled variation of nonpolar siloxane blocks and organic blocks, the copolymers (C) can be adapted in their compatibility to any of a very wide variety of polymer materials. The consequence is that from a single or just a few base materials, color masterbatches can be produced for virtually all polymer materials. Thus on the basis of polysiloxane copolymers (C), therefore, it is possible to produce universal masterbatches for virtually all polymer materials, but at least for major polymer material groups in each case, such as polyolefins, polyesters, styrene-based polymers, etc. It has emerged as being especially advantageous that the compositions of the invention exhibit high compatibility with a large number of polymer materials and blends thereof. They include, in particular, polyethylene, polypropylene, polyamide, polyethylene terephthalate, polybutylene terephthalate, thermoplastic elastomers based on crosslinked rubber, ethylene-vinyl acetate, polyhydroxybutyrate and/or copolymers or blends thereof. The composition of the invention may also be used for polystyrene, impact-modified polystyrene, styrene-acrylonitrile copolymers, acrylonitrile-butadiene-styrene copolymers, polyvinyl chloride, polymethyl methacrylate, polycarbonate, polyaryletherketone, polyacrylo-nitrile, polyetherimide, polyethylene naphthalate, polyether-sulfone, polyimide, polyamide, polyketone, polyoxymethylene, polyphenylene sulfide, polyphenylene sulfone, polysulfone, styrene-butadiene rubber, acrylonitrile-butadiene rubber, natural rubber, and copolymers or blends of these.

As a result of the high thermal stability of the components (A), (B) and (C), the use of the mixture according to the invention has the further advantage of not being significantly restricted by high processing conditions of the polymer materials to be colored.

Here, in particular, the siloxane (B) used ensures that even at high processing temperatures of more than 250° C., the composition of the invention has only a very low vapor pressure and can therefore not outgas in significant amounts.

Colored polymer materials in this context are producible in particular by mixing at least one polymer material with the composition of the invention in the melted state and cooling the mixture.

The polymer materials are preferably in the form of a shaped body obtainable by a shaping operation selected from the group consisting of injection molding, extrusion, compression molding, roll rotation, rotomolding, laser sintering, fused deposition modeling (FDM), granulating and/or casting, or else spinning.

The composition of the invention can be used advantageously for the spin dyeing of textile fibers and technical fibers, especially for the spin dyeing of partially oriented yarns. A particular advantage of the composition of the invention is that the physicochemical properties of the melt-spinnable polymers are retained to an extent such that the resulting polymer melt still remains spinnable.

Surprisingly it has emerged that the composition of the invention exhibits excellent homogeneity, i.e., no concentration gradient of the colorant (A) in the composition.

The compositions of the invention have the advantage that the compositions of the invention prove highly tolerant to a large number of plastics with which great compatibility exists in usage concentrations customary for the modification and processing of plastics.

The compositions of the invention have the advantage that even at relatively high processing temperatures of more than 200° C. they still have no significant vapor pressure and therefore do not lead to unwanted emissions during the thermoplastic processing operation at the necessary melting temperatures of more than 150° C.

A further advantage of the compositions of the invention in conjunction with other plastics is the improved rheology of the matrix in the melt, allowing a massive increase in throughput in the case of extrusion applications, for example. One of the reasons for this is that the components B and/or C also act as internal or external lubricants during polymer production.

An advantage of the method of the invention is that it is simple to carry out.

The method of the invention has the advantage that very easily even relatively high concentrations of colorants can easily be incorporated. On the basis of the silicone-containing carrier materials it is possible to produce pastes having the basic hues. Then, if desired, prior to their metered addition, these pastes can be mixed to the final hue in the course of the concluding polymer processing. A further key advantage is that the carrier material of the color masterbatch, in comparison to thermoplastic carrier materials, undergoes only a very low thermal load only a single time before the end use. As a result, there is a reduction in the influence of thermal degradation reactions on the matrix, but also on the pigments used.

The method of the invention has the advantage, further, that the use of the siloxane-organo copolymer (C) in the production of the compositions of the invention results in a substantially better dispersal of the colorants (A) in the siloxane (B) used, thereby enabling lower processing viscosities and/or higher pigment loadings.

The homogeneous dispersal of high concentrations of colorants (A) in these relatively low-viscosity systems is surprisingly very readily manageable and is realized without problems by means of the techniques established in the paint and varnish industry. An advantage of the composition of the invention is that the base components (B) and (C) used are polymeric compounds which may be distinguished with molar masses of >10 000 g/mol.

At the same time, the silicone-organo copolymer used also leads to a much finer distribution of the silicone-containing components of the composition of the invention when the latter is admixed to the polymer materials that are to be colored. A possible explanation for this is that the silicone-organo copolymers act as compatibilizers for the silicone products (B) used in the polymer material.

A further advantage of the composition of the invention lies in the possibility of metering it easily by means of established technologies even in very low dosages continuously to the polymer materials that are to be colored, hence allowing substantially more uniform coloration to be achieved, in particular during continuous processing operations.

In the examples described below are carried out, unless otherwise indicated, under a pressure of the surrounding atmosphere, in other words approximately at 1000 hPa, and at room temperature, in other words at approximately 23° C., or at a temperature which comes about when the reactants are combined at room temperature without additional heating or cooling, and also at a relative atmospheric humidity of about 50%. Furthermore, all data for parts and percentages are based on the weight, unless otherwise indicated.

PET (Polyethylene Terephthalate):
Polyethylene terephthalate HC 100 (from SABIC, Riyadh, Saudi Arabia).

Siloxane 1: trimethylsilyl-terminated polydimethylsiloxane having a viscosity of 1000 mPas (available commercially under the name "AK 1000" from Wacker Chemie AG, Munich (DE));

Pigment 1: Printex 60 pigmentary carbon black (available commercially under the name "Printex 60 Pulver" from Orion Engineered Carbons GmbH, Frankfurt, Germany).

Preparation of a Polysiloxane-Polycaprolactone Block Copolymer (Copolymer 1):

800 g of a bisaminopropyl-terminated polydimethylsiloxane having a molecular weight Mn of 3150 g/mol were mixed with 800 g of e-caprolactone (from Perstorp, Malmö, Sweden). Then 500 ppm of dibutyltin dilaurate were added and the reaction mixture was heated to 70° C. with stirring and held at this temperature for 1 hour. Thereafter it was heated to 140° C. and held at this temperature with stirring for 6 hours. Finally, under a high vacuum (<10 mbar), around 1 to 2% of volatile constituents of the reaction mixture were removed (cyclic siloxane species and ε-caprolactone). The copolymer obtained accordingly was subsequently cooled and ground.

This gave an OH-terminated polyorganosiloxane-polycaprolactone block copolymer having a siloxane content of 50 wt %, a melting point of 52° C. at 1000 hPa, and an average molecular weight Mn of 6320 g/mol.

Examples 2 to 9

The components specified in table 1 were used in the quantities identified in the table to produce compositions by first mixing copolymer 1 and siloxane 1 homogeneously with one another at a temperature of 70° C. and then mixing in pigment 1 by means of a centrifugal mixer ARE 310 (from Thinky Corporation, Tokyo, Japan) at a rotary speed of 2000 rpm for a duration of 2×8 minutes.

TABLE 1

| Example | Pigment 1 [g] | Siloxane 1 [g] | Copolymer 1 [g] |
|---|---|---|---|
| 2 | 27.5 | 54.4 | 18.1 |
| 3 | 27.5 | 58.0 | 14.5 |
| 4 | 27.5 | 59.7 | 12.8 |
| 5 | 30 | 52.5 | 17.5 |
| 6 | 30 | 56.0 | 14.0 |
| 7 | 33.3 | 50.0 | 16.7 |
| 8 | 33.3 | 53.4 | 13.3 |
| 9 | 33.3 | 54.9 | 11.8 |

The compositions of examples 2 to 9 thus obtained were characterized in terms of their viscosity profile. The results are found in table 2. The measurements were carried out on an MCR 301 rheometer from Anton Paar (Graz, Austria). In this case, the amount of the complex viscosity was determined using a cone/plate system in oscillation at a frequency of 1 Hz and a deformation rate of 0.02%.

TABLE 2

| Example | Viscosity 30° C. [Pas] | Viscosity 50° C. [Pas] | Viscosity 80° C. [Pas] | Viscosity 100° C. [Pas] |
|---|---|---|---|---|
| 2 | 28 870 | 7697 | 4245 | 4429 |
| 3 | 20 240 | 3281 | 2358 | 2371 |
| 4 | 22 360 | 7706 | 3268 | 4106 |
| 5 | 64 940 | 9426 | 6417 | 5882 |
| 6 | 12 710 | 3341 | 3508 | 3728 |
| 7 | 285 000 | 30 900 | 21 840 | 21 790 |
| 8 | 351 100 | 55 400 | 47 800 | 55 000 |
| 9 | 398 300 | 34 700 | 34 540 | 37 170 |

For the resulting compositions of examples 2 to 9, the viscosities (visc.) were determined at 80° C. and at different shear rates. The results are found in table 3. The measurements were carried out on an MCR 302 rheometer from Anton Paar (Graz, Austria). In this case, the amount of the complex viscosity was determined by means of the cone/plate system at different shear rates.

TABLE 3

| Example | Visc. [Pas] 0.1 1/s | Visc. [Pas] 1 1/s | Visc. [Pas] 10 1/s | Visc. [Pas] 100 1/s |
|---|---|---|---|---|
| 2 | 127 000 | 10 200 | 864 | 84.9 |
| 3 | 114 000 | 8770 | 762 | 76.1 |
| 4 | 198 000 | 16 100 | 1400 | 134 |
| 5 | 150 000 | 11 500 | 981 | 83.2 |
| 6 | 176 000 | 14 000 | 1210 | 116 |
| 7 | 163 000 | 13 500 | 1160 | 104 |
| 8 | 175 000 | 13 300 | 1150 | 101 |
| 9 | 290 000 | 20 100 | 1770 | 148 |

It was found that the viscosity of the compositions from examples 2 to 9 is heavily dependent on the pigment content. At constant pigment content, with increasing content of copolymer 1, the viscosity goes down at the same time, which likewise suggests more effective dispersal of the pigment in the composition.

Comparative Example 1

2.0 kg of HC 100 PET pellets were admixed with 0.5 kg of pigment 1, mixed homogeneously with one another, and metered via a hopper into a counterrotating twin-screw extruder ZSK 25 from Collin (Ebersberg, Del.). At a conveying rate of 1.5 kg/h, the kneader was heated at 150° C. in the first heating zone, at 220° C. in the second heating zone, at 250° C. in the third heating zone, at 245° C. in the fourth heating zone, at 245'C in the fifth heating zone, and at 240° C. at the die. The melt obtained was cooled to a strand in a water bath and was pelletized by means of a strand pelletizer.

Examples 10 to 13

To produce colored polymers, the reactants reported in table 4 were mixed homogeneously with one another in the proportions stated and the mixture was metered via a hopper into a counterrotating twin-screw extruder ZSK 25 from Collin (Ebersberg, Del.). At a conveying rate of 1.5 kg/h, the kneader was heated at 150° C. in the first heating zone, at 220° C. in the second heating zone, at 250° C. in the third heating zone, at 245° C. in the fourth heating zone, at 245° C. in the fifth heating zone, and at 240° C. at the die. The melt obtained was cooled to a strand in a water bath and was pelletized by means of a strand pelletizer.

TABLE 4

| Example | PET pellets | Color masterbatch | Amount of color masterbatch | Amount of pigment |
|---|---|---|---|---|
| 10 | 10.0 kg | | | |
| 11 | 9.85 kg | Example 7 | 0.15 kg | 0.05 kg |
| 12 | 9.85 kg | Example 9 | 0.15 kg | 0.05 kg |
| 13 | 9.75 kg | Comparative example 1 | 0.25 kg | 0.05 kg |

The mixtures thus produced were spun to PET fibers and the properties thereof were determined, along with a qualitative assessment of the spinning behavior. In this case, the polymer pellets obtained in examples 10-13 were melted in a single-screw extruder of type Rheomex from Thermo Haake (Karlsruhe, Del.) and spun through a die to form fibers. The temperature was 285° C. in zone 1, 290° C. in zone 2, 285° C. in zone 3, and the spinning head was heated at 290° C. The melt temperature was 290° C. Arranged in the spinning head were 32 spinning dies having a diameter of 300 μm. The fibers produced were drawn off using a winder from Oerlikon Barmag (Chemnitz, Del.) at a speed of 3000 m/min.

The results are found in table 5.

TABLE 5

| Mixture from example | Screw pressure [bar] | Spinning head pressure [bar] | Linear density [dtex] | Elongation [%] | Strength [cN/tex] | Spinning behavior |
|---|---|---|---|---|---|---|
| 10 | 12 | 50 | 100 | 116 | 28 | good |
| 11 | 26 | 28 | 98 | 130 | 19 | good |
| 12 | 12 | 26 | 100 | 134 | 19 | good |
| 13 | 18 | 26 | 99 | 134 | 19 | satisfactory |

The spinning experiments show that the strength of the PET fibers obtained is impaired slightly by the presence of the carbon black pigment, but the elongation is slightly increased. It is likewise found that the mixtures according to examples 11 and 12 exhibit better spinning behavior than the mixture from example 13 with the color masterbatch according to comparative example 1, but without having poorer mechanical properties.

The invention claimed is:

1. A colorant masterbatch composition comprising:
   (A) at least one colorant,
   (B) at least one organopolysiloxane containing units of the formula $$R_a(R^1O)_b SiO_{[4-(a+b)]/2} \qquad (I),$$

where
   R are identical or different and are monovalent, SiC-bonded, optionally substituted hydrocarbon radicals optionally interrupted by heteroatoms,
   $R^1$ are identical or different and are hydrogen or monovalent, optionally substituted hydrocarbon radicals optionally interrupted by heteroatoms,
   a is 0, 1, 2 or 3, and
   b is 0, 1, 2 or 3,
   with the proviso that the sum a+b≤3 and in more than 80% of all units of the formula (I) a is 2, and also
   (C) at least one siloxane-organo copolymer, the organic segments in the copolymers (C) comprising polyester segments,
   wherein the siloxane-organo copolymer is liquid over the range of 20° C. to 100° C.

2. The composition of claim 1, wherein the component (B) comprises organopolysiloxanes which are liquid at 20° C. and 1000 hPa.

3. The composition of claim 1, wherein the colorants (A) comprise inorganic or organic pigments.

4. The composition of claim 1, wherein the colorants (A) comprise carbon black or titanium dioxide.

5. The composition of claim 1, wherein the colorant (A) is used in amounts of 0.5 to 85 wt %, based on the total weight of the components (A), (B) and (C).

6. The composition of claim 1, wherein the siloxane segment has a fraction of the siloxane-organo copolymer (C) of at least 25 wt % and a fraction of the organic segment in component (C) is not more than 75 wt %.

7. The composition of claim 1, wherein the component (C) comprises a polysiloxane-polycaprolactone block copolymer containing siloxane segments having in each case a molecular weight Mn of 1000 to 10,000 g/mol.

8. A method for producing the organopolysiloxane composition as claimed in claim 1:

mixing the individual constituents (A), (B), and (C).

9. The method as claimed in claim 8, wherein the colorant (A) is mixed into the components (B) or (C) or into the mixture of (B) and (C).

10. The composition of claim 1, wherein the colorant is present in an amount of from 10 to 50 wt. % based on the total weight of the composition.

11. A colorant masterbatch composition comprising:

(A) at least one colorant, (B) at least one organopolysiloxane containing units of the formula $$R_a(R^1O)_bSiO_{[4-(a+b)]/2} \quad (I),$$

where

R are identical or different and are monovalent, SiC-bonded, optionally substituted hydrocarbon radicals optionally interrupted by heteroatoms, $R^1$ are identical or different and are hydrogen or monovalent, optionally substituted hydrocarbon radicals optionally interrupted by heteroatoms, a is 0, 1, 2 or 3, and b is 0, 1, 2 or 3, with the proviso that the sum a+b≤3 and in more than 80% of all units of the formula (I) a is 2, and also (C) at least one siloxane-organo copolymer, the organic segments in the copolymers (C) comprising polyester segments, wherein the composition contains up to 20 weight percent total, based on the total weight of the composition, of one or more of nanofillers, stabilizers, antistats, flame retardants, adhesion promoters, nucleating agents, propellants, and antibacterial agents, and no more than 20 wt. %, based on the total weight of the composition, of further substances.

12. The masterbatch composition of claim 1, which is liquid over the range of 20° C. to 100° C.

13. The masterbatch composition of claim 11, which is liquid over the range of 20° C. to 100° C.

14. The composition of claim 1, wherein the amount of component (C) is from 0.1 to 40 wt. % based on the total weight of components (A), (B), and (C).

* * * * *